United States Patent [19]

Leigh-Monstevens et al.

[11] Patent Number: 4,856,282

[45] Date of Patent: Aug. 15, 1989

[54] CENTER-FEED MASTER CYLINDER WITH RETAINER FOR VALVE STEM

[75] Inventors: Keith V. Leigh-Monstevens; Leslie P. Branum, both of Troy, Mich.

[73] Assignee: Automotive Products plc, Warwickshire, England

[21] Appl. No.: 49,133

[22] Filed: May 12, 1987

[51] Int. Cl.$^4$ .............................................. B60T 11/28
[52] U.S. Cl. ...................................................... 60/589
[58] Field of Search ............... 60/589, 533, 594, 581, 60/585; 92/26, 29, 256, 257; 251/904

[56] References Cited

U.S. PATENT DOCUMENTS

| | | | |
|---|---|---|---|
| 2,223,424 | 12/1940 | Main | 60/589 |
| 3,321,918 | 7/1965 | Tenniswood | 60/594 X |
| 3,382,772 | 5/1968 | Kampert | 92/256 |
| 3,654,839 | 4/1972 | Thompson | 92/256 |
| 4,188,860 | 2/1980 | Miller | 92/29 |
| 4,249,381 | 2/1981 | Gaiser | 60/589 |
| 4,407,125 | 10/1983 | Parsons | 60/584 |
| 4,463,562 | 8/1984 | Taft | 60/589 |
| 4,528,895 | 7/1985 | Nakamura | 60/589 |
| 4,557,110 | 12/1985 | Price | 60/589 |
| 4,557,288 | 12/1985 | Botnick | 137/315 |
| 4,599,860 | 7/1986 | Parsons | 60/584 |
| 4,679,618 | 7/1987 | Farkas | 251/904 |
| 4,679,680 | 7/1987 | Komatz | 60/589 |
| 4,685,301 | 8/1987 | Bacardit | 60/589 |

FOREIGN PATENT DOCUMENTS

| | | |
|---|---|---|
| 0169560 | 1/1986 | European Pat. Off. . |
| 0181761 | 5/1986 | European Pat. Off. . |
| 865847 | 4/1953 | Fed. Rep. of Germany .......... 92/26 |
| 1530711 | 3/1969 | Fed. Rep. of Germany . |
| 448212 | 5/1949 | Italy ...................................... 60/533 |
| 516283 | 12/1939 | United Kingdom . |
| 859911 | 1/1961 | United Kingdom . |
| 1455316 | 11/1976 | United Kingdom . |
| 2076095 | 5/1980 | United Kingdom . |
| 2121131 | 5/1982 | United Kingdom . |
| 2121899 | 1/1984 | United Kingdom . |
| 2135412 | 2/1984 | United Kingdom . |

Primary Examiner—Robert E. Garrett
Assistant Examiner—George Kapsalas
Attorney, Agent, or Firm—Krass & Young

[57] ABSTRACT

A master cylinder of the center feed type including a cylinder defining an axially extending pressure chamber and including a reservoir port proximate the front end of the cylinder for connection with a fluid reservoir; a piston slidably positioned in the cylinder and adapted for coaction with a piston rod extending into the rear end of the cylinder; a valve assembly in the pressure chamber including a valving member proximate the reservoir port and a valve stem secured to the valving member and extending axially rearwardly in the pressure chamber; and a retainer on the front end of the piston. The retainer includes a socket at its rear end for telescopic receipt of a reduced diameter nose portion on the front end of the piston and includes a plurality of rearwardly extending finger portions including head portions at their free, rear ends defining camming surfaces which coact with a camming surface defined by the head portion of the valve stem to cammingly separate the free ends of the finger portions in response to axial insertion of the head portion of the valve stem therebetween so as to snappingly connect the valve stem to the piston assembly in response to relative axial movement therebetween.

The retainer is ultrasonically welded to the nose portion of the piston and coacts with the piston to define an annular outwardly opening seal groove at the interface of the retainer and the piston.

16 Claims, 1 Drawing Sheet

CENTER-FEED MASTER CYLINDER WITH RETAINER FOR VALVE STEM

BACKGROUND OF THE INVENTION

1. Field of the Invention

This invention relates to cylinder assemblies and more particularly to a valve stem retainer particularly suited for use with a master cylinder of the center feed type.

2. Description of the Prior Art

A master cylinder of the center feed type includes a cylinder defining an axially extending pressure chamber and including a reservoir port proximate the front end of the cylinder for communication with a fluid reservoir; a piston slidably positioned in the cylinder and adapted for coaction with a piston rod extending into the rear end of the cylinder; a valve assembly in the pressure chamber including a valving member proximate the reservoir port and a valve stem secured to the valving member and extending axially rearwardly in the pressure chamber; and a retainer on the front end of the piston connected to an enlarged head portion on the free end of the valve stem.

In operation, when the piston is moved forwardly in the cylinder by actuation of the piston rod, the pressure fluid forwardly of the piston moves the valving member into seating engagement with the reservoir port and the valve stem moves axially into a central axial bore in the front end of the piston to allow the piston to continue to move toward the front end of the cylinder to discharge pressure fluid from the cylinder through a suitable discharge port. As the piston thereafter moves rearwardly in the cylinder upon retraction of the piston rod, the valve stem slides axially in the central bore in the piston until the piston approaches the end of its return stroke at which time the retainer on the piston engages the head portion of the valve stem and pulls the valving member out of seating engagement with the reservoir port to establish fluid communication between the reservoir and the cylinder pressure chamber to ensure total filing of the pressure chamber behind the retreating piston. An example of a center feed master cylinder of this type is shown in U.S. Pat. No. 4,407,125 assigned to the assignee of the present invention.

Whereas center feed master cylinders of this type provide a relatively compact and efficient overall package, assembly and disassembly of the cylinder is difficult and time consuming, in part because of the complex procedure required to assemble and disassembly the retainer to and from the head portion of the valve stem of the valve assembly.

SUMMARY OF THE INVENTION

This invention is directed to the provision of an improved cylinder assembly.

More specifically, this invention is directed to the provision of a valve stem retainer which, when utilized in a center feed master cylinder assembly, greatly simplifies the assembly and disassembly of the master cylinder assembly.

According to the invention, means are provided on the front end of the piston of the center feed master cylinder assembly which are operative in response to axial movement between the piston and the valve stem of the valve assembly to snappingly secure the head portion of the valve stem to the piston. This arrangement greatly simplifies assembly and disassembly of the overall cylinder assembly.

According to a further feature of the invention, the securing means on the front end of the piston comprises a plurality of circumferentially spaced resilient fingers extending axially forwardly from the front end of the piston for snapping engagement of the valve stem head portion. With this arrangement, the head portion of the valve stem snaps securely into position relative to the piston in response to relative axial movement therebetween.

According to a further feature of the invention, the assembly further includes a retainer member secured to the front end of the piston and the retainer member defines the resilient fingers. This arrangement provides a simple and inexpensive means of providing the fingers for snapping engagement with the valve stem head portion.

According to a further feature of the invention, the retainer member includes a central bore sized to pass the valve stem head portion, the resilient fingers are circumferentially arranged about the central bore, and the piston includes a blind bore opening in the front face of the piston, sized to pass the valve stem head portion, axially aligned with the central bore in the retainer member. This arrangement allows the valve stem head portion to move into snapping engagement with the free ends of the resilient fingers of the retainer member and thereafter, upon actuation of the piston of the master cylinder assembly, move rearwardly into the central bore in the piston to allow the piston to complete its power stroke.

According to a further feature of the invention, the valve stem includes an annular shoulder defined at the front face of the head portion thereof and each of the resilient fingers includes a head portion at its front end defining a radially inwardly extending shoulder surface for coaction, in the snappingly engaged positions of the retainer member and the valve stem, with the annular shoulder on the valve stem to preclude inadvertent withdrawal of the valve stem from the retainer member.

According to a further feature of the invention, the head portion of each resilient finger further includes a radially outwardly extending shoulder surface and the assembly further includes an annular member encircling the fingers rearwardly of the radially outwardly extending shoulder surfaces to delimit radial outward expansion of the fingers. In one embodiment of the invention the annular member comprises a resilient O-ring and in a further embodiment of the invention the annular member comprises a sleeve.

The invention further provides a unique cylinder assembly including a cylinder defining an axially extending pressure chamber; a piston slidably positioned in the pressure chamber, defining a rearwardly opening socket at it rear face, and including a blind central bore opening at its front face; an annular insert member positioned in the socket; and a retainer member secured to the front end of the piston member and defining a plurality of forwardly extending fingers circumferentially arranged about the central bore in the piston. This cylinder assembly functions to provide a convenient means for readily securing the front end of the piston to an associated valve stem of the cylinder assembly and further functions to provide a convenient means for connecting the rear end of the piston to the associated piston rod in a manner to distribute the loading on the piston over a wide area of the piston to thereby minimize the stress loading on the piston.

The invention further provides a unique piston and cylinder assembly in which an auxiliary piston member is secured to the front end of the piston and coacts with the piston to define an annular, radially outwardly opening groove at the interface of the piston and the auxiliary piston member, and an annular seal is positioned in the groove for sealing engagement with the inner walls of the cylinder. This arrangement provides a seal groove that is devoid of mold flash lines so as to maximize the life and effectiveness of the seal.

DETAILED DESCRIPTION OF THE PREFERRED EMBODIMENT

Figure 1:
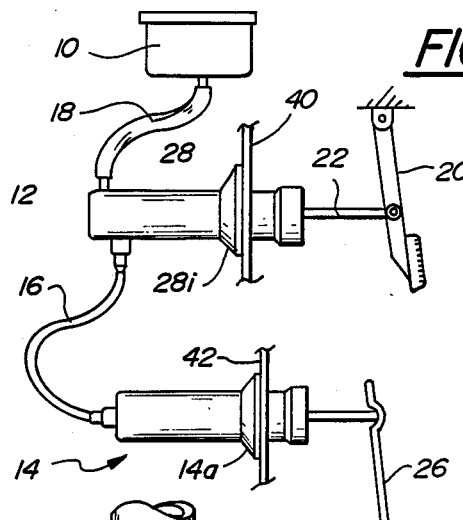
FIG. 1 is a schematic view of an hydraulic apparatus including a master cylinder and a slave cylinder.

The hydraulic apparatus shown schematically in FIG. 1 includes a reservoir 10, a master cylinder assembly 12, slave cylinder assembly 14, a high pressure conduit 16 interconnecting the outlet of master cylinder 12 and the inlet of slave cylinder 14 and a low pressure supply conduit 18 interconnecting the outlet of reservoir 10 and the inlet of master cylinder 12. The hydraulic apparatus of FIG. 1 may be utilized for example in a motor vehicle wherein actuation of a clutch pedal 20 by the vehicle operator actuates the piston rod 22 of the master cylinder 12 to force pressurized fluid outwardly from cylinder 12 through conduit 16 to slave cylinder 14 where the pressurized fluid acts to extend the output member outwardly to actuate a clutch relief lever 26. An hydraulic apparatus of the type shown in FIG. 1 is disclosed, for example, in U.S. Pat. No. 4,599,860 to David Parsons and assigned to Automotive Products plc of Warwickshire, England.

Master cylinder assembly 12 includes a cylinder 28, a piston 30, a annular insert 32, a valve stem retainer 34, a valving assembly 36, and a valve guide member 38.

Cylinder 28 may be formed of plastic or other suitable rigid material and includes a main body portion 28a; an axially extending pressure chamber 28b; an open rear end 28c; a front end wall 28d; a reservoir port 28e defined centrally in front end wall 28d; an inlet fitting 28f communicating with reservoir port 28e and receiving the lower end of supply conduit 18; a discharge fitting 28g communicating with the upper end of working pressure conduit 16 and defining a discharge port 28h; and a flange portion 28i for use in securing the cylinder to a suitable vehicular bulkhead 40. Slave cylinder 14 is similarly secured to a vehicle bulkhead 42 by the use of slave cylinder flange portion 14a.

Piston 30 may also be formed of a suitable plastic material such, for example, as glass reinforced nylon or a lubricated plastic including an internal lubricant such as molybdenum disulfide or a low friction polymer such as polytetrafluoroethylene. Piston 30 includes a reduced diameter nose portion 30a at its front end, a main body portion 30b, a trailing or rear portion 30c, a flange 30d at the front end of main body portion 30b forming an annular shoulder 30e with reduced diameter central bore portion 30a, and a rear flange portion 30f.

A socket 30g is provided in the rear face of the piston and includes a main body cylindrical portion 30h extending forwardly from the rear face of the piston and a generally hemispherical front end portion 30i. Socket 30g is centered on the centerline of piston 30 and on the centerline of cylinder 28.

Annular insert 32 is formed as a metal stamping and includes a cylindrical main body portion 32a, a generally hemispherical front end portion 32b, and an annular flange portion 32c at the rear end of the insert member. A plurality of prongs or tabs 32d are stuck inwardly from main body portion 32a at circumferentially spaced locations thereabout. Prong portions 32d extending inwardly and forwardly toward hemispherical front end portion 32b. Insert 32 is preferably formed of a ferrous material but may also be formed of other metallic materials.

Valve retainer 34 is generally annular and is preferably formed of a suitable plastic material, preferably identical to the material utilized for the piston 30. Retainer 34 includes an annular main body portion 34a defining a bore 34b, a rear flange portion 34c, a hub portion 34d defining a central bore 34e which in turn forms an annular shoulder 34f with bore 34b, and a plurality of resilient finger portions 34g extending forwardly in cantilever fashion from hub portion 34d in circumferentially spaced relation about central bore 34e.

Bore 34b and shoulder 34f together define a socket 34h sized to telescopically receive nose portion 30a of piston 30. Bore 34b has an axial length substantially less than the axial length of piston nose portion 30a so that, with retainer 34 fitted over nose portion 30a and the front end of the nose portion abutted against shoulder 34f, the rear annular face 34i of retainer 34 coacts with piston nose portion 30a and piston flange portion 30d to define an annular, radially outwardly opening seal groove 43.

Each finger portion 34g includes a head portion 34j at the free forward end of the finger portion of generally triangular configuration. Each head portion 34j extends radially inwardly from the main body portion of the associated finger portion to define a radially inwardly extending shoulder surface 34k and extends radially outwardly from the main body portion of the associated finger portion to define a radially outwardly extending shoulder surface 34l. Each head position further defines a camming surface 34m.

Figures 4, 5:
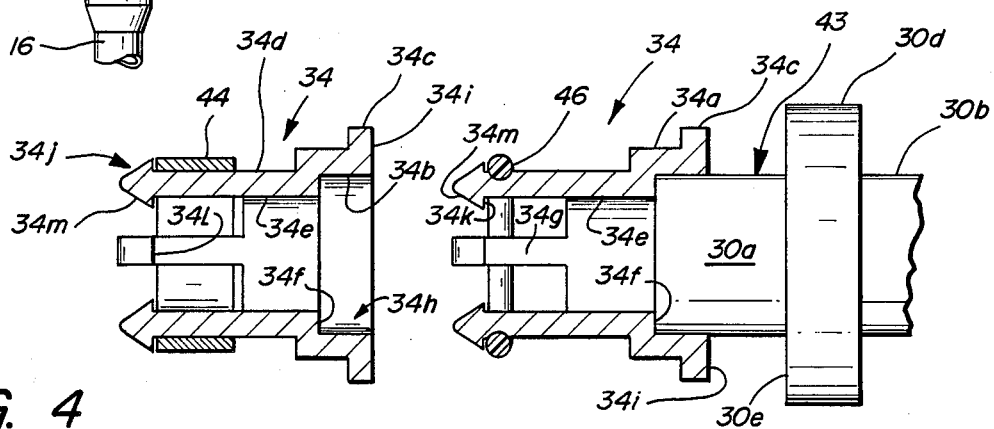
FIGS. 4 and 5 are cross-sectional views of the valve stem retainer embodied in the master cylinder of FIG. 2.
Figure 6:
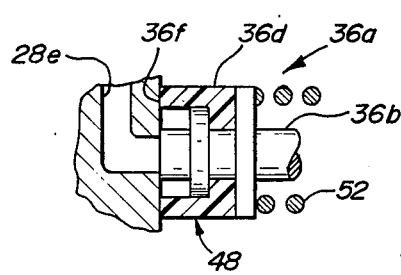
FIG. 6 is a detail view of the structure within the circle 6 of FIG. 2.

An annular member is provided to encircle the finger portions 34g rearwardly of radially outwardly extending shoulder surfaces 34l and delimit radially outward expansion of the finger portions. The annular member may comprise an annular sleeve 44 as seen in FIG. 4 or may comprise a resilient O-ring 46 as seen in FIG. 5.

Valve assembly 36 includes a valving member 36a, a valve stem 36b, and a valve stem head portion 36c. Valving member 36a includes axially spaced flange portions 36d and 36e and a cup shaped resilient sealing member 48 fited around valve stem 36b between flange portions 36d and 36e and presenting an annular sealing surface 36f for coaction with cylinder end wall 28d around reservoir port 28e. Valve stem head portion 36c is generally conical in configuration and defines a conical camming surface 36g at the rear face of the head portion and an annular shoulder 36g at the front face of the head portion.

Valve guide member 38 may be formed of a suitable plastic material and includes a main body generally conical portion 38a defining a central bore 38b at its rear face and an annular flange portion 38c at the front face of the guide member. A plurality of circumferentially spaced openings 38d are provided in main body portion 38a.

To assemble the invention center feed master cylinder, annular insert 32 is positioned in socket 30f; an annular seal 50 is positioned on nose portion 30a of the piston against the forward annular face of piston flange portion 30d; retainer member 34 is fitted over the nose portion 30a of the piston to position the rear annular face 34i of the retainer member against seal 50 and complete seal groove 43; the retainer member is secured to the piston by ultrasonic welding or the like; valve assembly 36 is assembled to valve guide 38 with a valve guide return spring 52 positioned between valving member flange 36e on the front end of valve guide member main body portion 38a; a main return spring 54 is positioned over valve guide member 38 with its front end bearing against valve guide flange portion 38c; and the subassembly comprising valve assembly 36, valve guide member 38, and return spring 54 is moved axially relative to the piston subassembly to pass valve stem head portion 36c between fingers 34g and seat the free end of spring 54 against valve stem retainer flange portion 34c. As head portion 36c of valve stem 36b engages the front ends of fingers 34g, the cam surface 36g on head portion 34c coacts with the cam surfaces 34m on the head portions 34j of the finger portions 34g to move the free ends of the finger portions cammingly and resiliently outwardly to allow valve stem head portion 36c to pass therethrough, whereafter the shoulder surfaces 34k defined by finger portions 34g snap into place behind the annular shoulder 36h defined by head portion 36c to define the snappingly engaged coacting position of the valve stem and the valve stem retainer. The entire assembly is now fit axially into cylinder 28 to position valve guide 38 against end wall 28d of the cylinder. In the fully inserted position of the assembly, return spring 54 biases valve stem retainer 34 and piston 30 rearwardly to press flange portion 32c of annular insert 32 against a split ring 56 positioned in the open rear end 28c of the cylinder. In this assembled condition, valving member 36a is maintained by finger portions 34g in a position in which it is axially withdrawn from reservoir port 28e so as to allow fluid communication from the reservoir through port 28e, past annular seal 36f, and through openings 38d to thereby allow the reservoir to fill the pressure chamber 28b. Note that return spring 54 is significantly stronger than valve guide spring 52 so that spring 52 is maintained in a compressed condition in the retracted position of the piston 30.

It will be understood that the head portion of piston rod 22 of master cylinder 28 is snappingly received in insert 32 with springs 32d engaging an annular shoulder defined on the head portion of the piston rod to preclude inadvertent withdrawal of the piston rod from the retainer. Further details of the construction of annular insert 32 and the manner in which it coacts with the head of the piston rod are disclosed in applicant's copending U.S. patent application, Ser. No. 56,058 filed on June 1, 1987.

When piston 30 is moved forwardly in cylinder 28 upon depression of clutch pedal 20 to actuate piston rod 22, valve assembly 36 initially moves forwardly with piston 30 and valve stem retainer 34 under the urging of valve guide spring 52 to seat annular sealing surface 36f around reservoir discharge port 28e and preclude communication between the reservoir and pressure chamber 28b, whereafter continued forward movement of piston 30 under the impetus of piston rod 22 to discharge pressure fluid through conduit 16 to slave cylinder 14 is accommodated by the axial movement of head portion 36c and valve stem 36b within axial bore 30i. When clutch pedal 20 is thereafter released, the piston and valve stem retainer are moved through their return stroke under the urging of return spring 54. As the piston and retainer approach their fully retracted position as defined by engagement of flange portion 32c of insert 32 with split ring 56, shoulder surfaces 34k on finger portions 34e engage annular shoulder 36h on valve stem head portion 36c and move the valve assembly 36 rearwardly against the resistance of spring 52 to move annular valving surface 36f away from end wall 28d to establish fluid communication between the reservoir and the cylinder pressure chamber to ensure total filling of the pressure chamber behind the retreating piston.

It will be seen that valve retainer 34 acts effectively to allow the rapid assembly of the valve assembly to the piston while further acting to efficiently move the valve assembly away from its seated position relative to the reservoir port as the piston approaches the end of its return stroke. It will be appreciated that the valve assembly may also be readily disassembled from the piston by the use of a suitable tool (not shown) which is moved axially along valve stem 36b and into camming engagement with head portions 34j of finger portions 34g to allow the finger portions to flex resiliently outwardly and allow the ready withdrawal of valve stem 36 to disconnect the valve assembly from the piston assembly. It will be understood that O-ring 46 delimits the radial outward expansion of finger portions 34g to discourage inadvertent separation of the valve assembly from the piston assembly and yet allows controlled radial expansion of the finger portion to facilitate assembly and disassembly of the valve assembly relative to the piston assembly.

Figure 3:
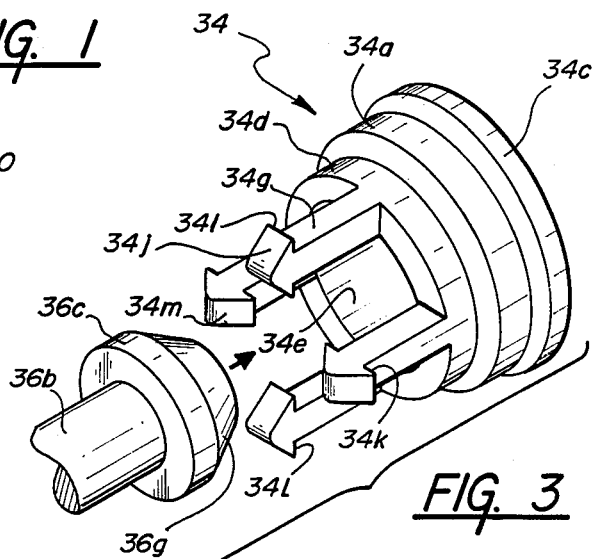
FIG. 3 is a fragmentary perspective view of a valve stem retainer embodied in the master cylinder of FIG. 2.
Figure 2:
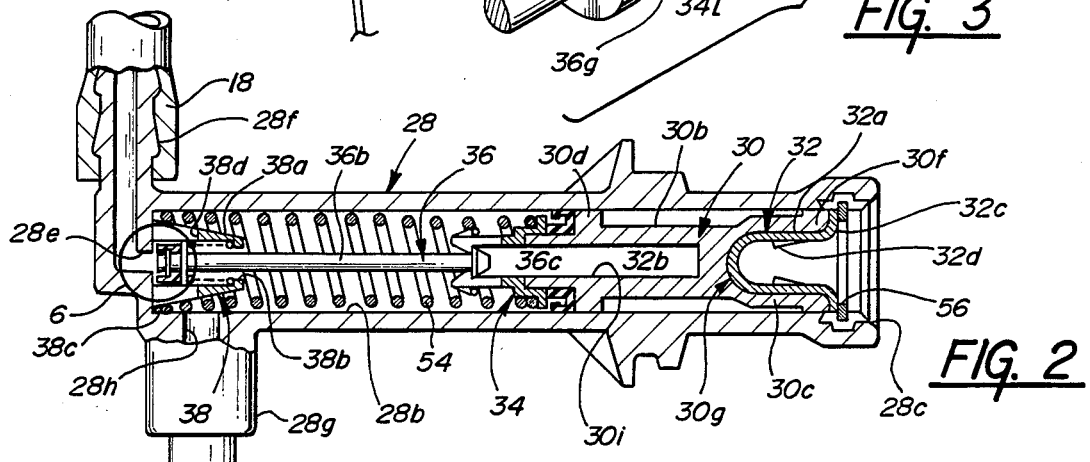
FIG. 2 is a fragmentary cross sectional view of the master cylinder of the hydraulic apparatus of FIG. 1.

When the sleeve 44 of FIG. 3 is employed with the valve stem retainer, the sleeve is slid to the right as viewed in FIG. 3 to allow assembly or disassembly of the valve assembly to the piston assembly and is slid to the left following insertion of the valve stem to preclude inadvertent separation of the valve stem from the retainer.

In addition to facilitating the assembly and disassembly of the valve assembly, retainer 34 further acts as an auxiliary piston member which coacts with the piston 30 to define an annular seal groove 43 which is totally free of the flash lines that would be present in groove 43 if the piston was formed of one piece and the groove was formed in a molding operation. The invention arrangement, by eliminating the mold flash lines, contributes to the effectiveness and the life of the seal.

The term "snappingly secure" wherever used herein refers to a mechanical connection between two components achieved by causing a drive member on one of the components to cam open a gap or aperture between resiliently related members on the other of the components when the two components are urged together, until at a given degree of proximity the drive member passes sufficiently through the aperture to allow the resiliently related members to rapidly close relative to one another and thereafter resist disassociation of the two components.

Whereas a preferred embodiment of the invention has been illustrated and described in detail it will be apparent that various changes may be made in the disclosed embodiment without departing from the scope or spirit of the invention.

We claim:

1. A cylinder assembly comprising:
(A) a cylinder defining an axially extending pressure chamber and including a reservoir port proximate the front end of the cylinder for communication with a fluid reservoir;
(B) a piston slidably positioned within said cylinder and adapted for coaction with a piston rod extending into the rear end of the cylinder;
(C) a valve assembly in said pressure chamber including a valving member proximate said reservoir port and a valve stem secured to said valving member and extending axially rearwardly into said chamber and having a head portion at its rearward end; and
(D) a plurality of circumferentially spaced resilient fingers extending axially forwardly from the front end of said piston and coacting in their relaxed condition to define an opening of lesser diameter than the diameter of said valve stem head portion but yieldable outwardly in response to rearward axial movement of said valve stem head portion therebetween to allow passage of said valve stem head portion therebetween, said valve stem head portion defining a shoulder at its front face and said fingers each defining a radially inwardly extending shoulder surface adjacent its free forward end, said shoulder and said shoulder surfaces coacting following rearward passage of said valve stem head portion between said fingers to preclude separation of said valve stem from said fingers while allowing free rearward movement of said valve stem relative to said fingers, the rear face of said valve stem head portion and the free forward ends of said fingers coacting to define camming means to facilitate the passage of said valve stem head portion between said fingers in response to rearward axial movement of said valve stem head portion.

2. A cylinder assembly according to claim 1 wherein:
(F) said assembly further includes a retainer member secured to the front end of said piston and defining said fingers.

3. A cylinder assembly according to claim 2 wherein:
(G) said retainer member includes a central bore sized to pass said valve stem head portion;
(H) said fingers are circumferentially arranged about said central bore; and
(I) said piston includes a blind bore opening in the front face thereof, sized to pass said valve stem head portion, and axially algined with said central bore in said retainer member.

4. A cylinder assembly according to claim 3 wherein:
(J) said valve stem head portion shoulder is annular; and
(K) each of said fingers includes a head portion at its front end defining said radially inwardly extending shoulder surface.

5. A cylinder assembly according to claim 4 wherein:

(L) said head portion of each finger further includes a radially outwardly extending shoulder surface; and
(M) said assembly further includes an annular member encircling said fingers rearwardly of said radially outwardly extending shoulder surfaces to delimit radial outward expansion of said fingers.

6. A cylinder assembly according to claim 5 wherein:
(N) said annular member comprises a sleeve.

7. A cylinder assembly comprising:
(A) a cylinder defining an axially extending pressure chamber and including a reservoir port proximate the front end of the cylinder for communication with a fluid reservoir;
(B) a piston slidably positioned within said cylinder and adapted for coaction with a piston rod extending into the rear end of the cylinder;
(C) a valve assembly in said pressure chamber including a valving member proximate said reservoir port and a valve stem secured to said valving member and extending axially rearwardly into said chamber and having a head portion at its rearward end; and
(D) a plurality of circumferentially spaced resilient fingers extending axially forwardly from the front end of said piston and coacting in their relaxed condition to define an opening of lesser diameter than the diameter of said valve stem head portion but yieldable radially outwardly in response to rearward axial movement of said valve stem head portion therebetween to allow passage of said valve stem head portion therebetween, said valve stem head portion defining a shoulder at its front face and said fingers each defining a radially inwardly extending shoulder surface adjacent to its free forward end, said shoulder and said shoulder surfaces coacting following rearward passage of said valve stem head portion between said fingers to preclude separation of said valve stem from said fingers while allowing rearward movement of said valve stem relative to said fingers;
(E) said assembly further including a retainer member secured to the front end of said piston and defining said fingers;
(F) said retainer member including a central bore sized to pass said valve stem head portion;
(G) said fingers being circumferentially arranged about said central bore;
(H) said piston including a blind bore opening in the front face thereof, sized to pass said valve stem head portion, and axially aligned with said central bore in said retainer member;
(I) said valve stem head portion shoulder being annular;
(J) each of said fingers including a head portion at its front end defining said radially inwardly extending shoulder surface;
(K) said head portion of each finger further including a radially outwardly extending shoulder surface; and
(L) said assembly further including a resilient O-ring encircling said fingers rearwardly of said radially outwardly extending shoulder surface to delimit radial outward expansion of said fingers.

8. A cylinder assembly comprising:
(A) a cylinder defining an axially extending pressure chamber;
(B) a piston slidably positioned in said pressure chamber, defining a rearwardly opening socket at its rear face, and including a blind central bore opening at its front face;

(C) an annular insert member positioned in said socket; and (D) a retainer member secured to the front end of said piston member and defining a plurality of forwardly extending resilient fingers circumferentially arranged about said central bore and each defining a radially inwardly extending and rearwardly facing shoulder surface.

9. A cylinder assembly according to claim 8 wherein:

(E) said cylinder includes a reservoir port proximate the front end thereof;

(F) said cylinder assembly further includes a valve assembly including a valving member proximate said reservoir port and a valve stem secured to said valving member and extending axially rearwardly within said pressure chamber;

(G) said valve stem includes a head portion at its rearward end; and (H) each of said fingers includes a head portion at its forward end defining said shoulder surface and snappingly coacting with said valve stem head portion.

10. A cylinder assembly comprising:

(A) a cylinder defining an axially extending pressure chamber and a reservoir port proximate to the front end of the cylinder for communication with a fluid reservoir;

(B) a piston slidably positioned in said pressure chamber;

(C) a piston rod secured to the rear end of said piston;

(D) an auxiliary piston member formed as a separate member from said piston;

(E) means securing said auxiliary piston member to the front end of said piston, said auxiliary piston member coacting with said piston to define an annular radially opening groove at the interface of said piston and said auxiliary piston member;

(F) an annular seal positioned in said groove and sealingly engaging the inner walls of said cylinder;

(G) said assembly further including a valve assembly in said pressure chamber including a valving member proximate said reservoir port and a valve stem secured to said valving member and extending axially rearwardly into said chamber and having a head portion at its rearward end; and (H) said auxiliary piston member including a plurality of circumferentially spaced resilient fingers extending axially forwardly from the front end of said auxiliary piston member and operative in response to axial movement between said piston and said stem to snappingly secure said valve stem head portion to said auxiliary piston member.

11. A cylinder assembly according to claim 10 wherein:

(J) said auxiliary piston member includes a central bore sized to pass said valve stem head portion;

(K) said fingers are circumferentially arranged about said central bore; and (L) said piston includes a blind bore opening in the front face thereof sized to pass said valve stem head portion, and axially align with said central bore in said auxiliary piston member.

12. A cylinder assembly according to claim 11 wherein:

(M) said valve stem includes an annular shoulder defined at the front face of said head portion; and (N) each of said fingers includes a head portion at its front end defining a radially inwardly extending shoulder surface for coaction in the snappingly engaged positions of said auxiliary piston member and said valve stem with said annular shoulder on said valve stem.

13. A cylinder assembly including:

(A) a cylinder defining an axially extending pressure chamber;

(B) a piston slidably positioned in said pressure chamber;

(C) a piston rod secured to the rear end of said piston;

(D) an auxiliary piston member formed as a separate member from said piston;

(E) said auxiliary piston member being secured to the front end of said piston and coacting with said piston to define an annular radially opening groove at the interface of said piston and said auxiliary piston member;

(F) an annular seal positioned in said groove sealingly engaging the inner wall of said cylinder;

(G) said cylinder including a reservoir port proximate the front end of the cylinder for communication with a fluid reservoir;

(H) said assembly further including a valve assembly in said pressure chamber including a valving member proximate said reservoir port and a valve stem secured to said valving member and extending axially rearwardly into said chamber and having a head portion at its rearward end;

(I) said auxiliary piston member including means on the front end thereof operative in response to axial movement between said piston and said stem to snappingly secure said valve stem head portion to said auxiliary piston member;

(J) said securing means comprising a plurality of circumferentially spaced resilient fingers extending axially forwardly from the front end of said auxiliary piston member for snapping engagement with said valve stem head portion;

(K) said auxiliary piston member including a central bore sized to pass said valve stem head portion;

(L) said fingers being circumferentially arranged about said central bore;

(M) said piston including a blind bore opening in the front face thereof sized to pass said valve stem head portion and axially aligned with said central bore in said auxiliary piston member;

(N) said valve stem including a annular shoulder defined at the front face of said head portion;

(O) each of said fingers including a head portion at its front end defining a radially inwardly extending shoulder surface for coaction in the snappingly engaged positions of said auxiliary piston member and said valve stem with said annular shoulder on said valve stem;

(P) said piston including a main body portion and a reduced diameter nose portion at its front end forming an annular forwardly facing shoulder with said main body portion;

(Q) said auxiliary piston member defining a central socket at its rear end sized to telescopically receive said piston nose portion with the annular rear face of the auxiliary piston member around said socket spaced forwardly from said shoulder to define said seal groove.

14. A cylinder assembly according to claim 13 wherein:

(R) said auxiliary piston member includes a radially outwardly extending flange portion; and (S) said assembly further includes a return spring extending between the front end of said cylinder and said flange portion.

15. A cylinder assembly according to claim 14 wherein:

(T) said flange portion is at the rear end of said auxiliary piston member in surrounding relation to said socket and forms the front annular wall of said seal groove.

16. A cylinder assembly according to claim 15 wherein:

(U) said piston and said auxiliary piston member are formed of a plastic material; and (M) said auxiliary piston member is secured to said piston nose portion by ultrasonic welding.

* * * * *